United States Patent
Gasperetti et al.

[11] Patent Number: 6,010,552
[45] Date of Patent: Jan. 4, 2000

[54] APPARATUS FOR THE PROCESS OF MELTING AND PURIFICATION OF ALUMINUM, COPPER, BRASS, LEAD AND BRONZE ALLOYS

[75] Inventors: Bruno Gasperetti, Weisbaden, Germany; Anatolj Kolesnichenko, Naberezhnaja, Ukraine

[73] Assignee: S.E.TRI. S.r.l., Trieste, Italy

[21] Appl. No.: 08/971,581

[22] Filed: Nov. 17, 1997

[30] Foreign Application Priority Data

Nov. 15, 1996 [IT] Italy ................................. TS96A0011

[51] Int. Cl.[7] ..................................................... C21B 11/10
[52] U.S. Cl. ......................... 75/10.16; 266/200; 266/900; 266/234
[58] Field of Search ............................... 75/10.14, 10.16; 266/200, 900, 234

[56] References Cited

U.S. PATENT DOCUMENTS

| 3,764,305 | 10/1973 | Andersson . |
| 3,948,643 | 4/1976 | Fredriksson et al. ................... 75/10.14 |
| 4,512,801 | 4/1985 | Shigihara et al. . |
| 4,867,786 | 9/1989 | Saeki et al. . |
| 5,071,471 | 12/1991 | Miki et al. ............................... 75/10.14 |

FOREIGN PATENT DOCUMENTS

| 0006306 | 1/1980 | European Pat. Off. . |
| 0252308 | 1/1988 | European Pat. Off. . |
| 0397486 | 11/1990 | European Pat. Off. . |
| 2672620 | 8/1992 | France . |
| 2406480 | 8/1974 | Germany . |

*Primary Examiner*—Scott Kastler
*Attorney, Agent, or Firm*—Browdy and Neimark

[57] ABSTRACT

The present apparatus is comprised by two magnetic induction sets, one for melting of the raw material and the second for purification of molten metal; each set comprises a pot or crucible (1, 1'), an electromagnetic device, a filter (11) and a power supply; each crucible (1, 1') is surrounded in the lower part by a hollow permanent magnet (3, 3') in which three pairs of electromagnets facing each other are arranged; the process consists of the following stages: a) charging of metallic raw material inside a crucible (1); b) electromagnetic induction heating to melt the metallic raw material (2) inside crucible (1) through a three-phase magnetic system creating a horizontal travelling or pules magnetic field which builds a turbulent flux inside the melt (2'); c) whirling stirring of melt (2') by electromagnetic induction and purification of it via extraction of hydrogen and of non-electroconductive inclusions by coagulation of them in agglomerates; d) discharging of purified melt (2') by a magneto-hydrodynamic pump effect for the next treatment or technological actions such as the continuous or periodical casting through a filter for the mechanical filtration of the agglomerates.

18 Claims, 10 Drawing Sheets

I-I

II-II

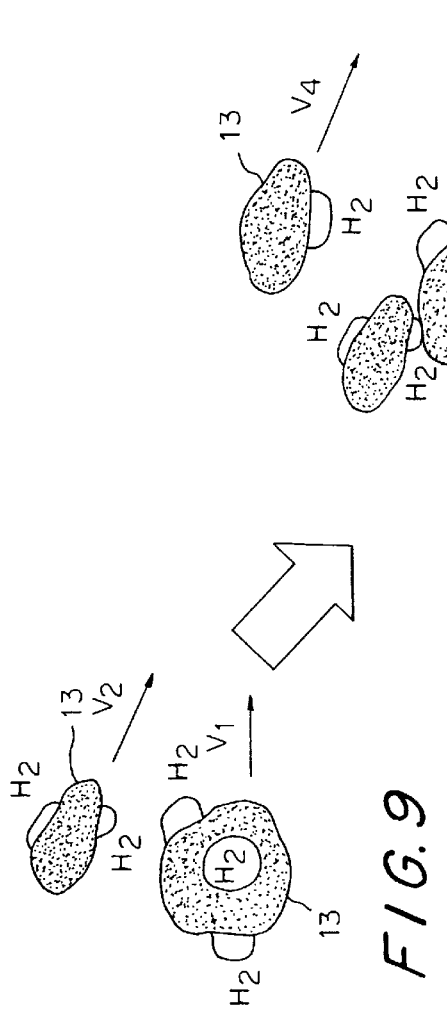
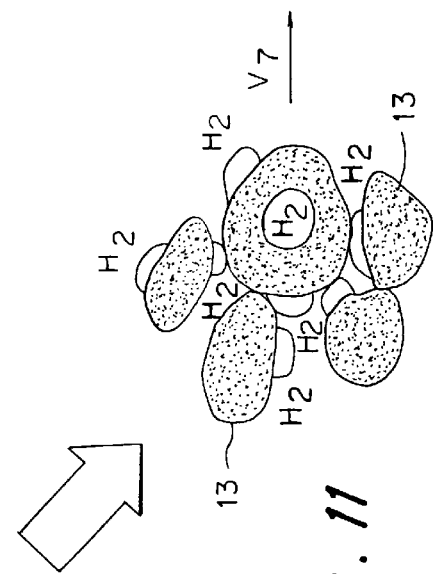
FIG. 9
FIG. 10
FIG. 11

APPARATUS FOR THE PROCESS OF MELTING AND PURIFICATION OF ALUMINUM, COPPER, BRASS, LEAD AND BRONZE ALLOYS

BACKGROUND OF THE INVENTION

1. Technical Field

The present invention relates to the apparatuses and methods in the metallurgical field, especially for electromagnetic melting and purification of aluminium, copper, brass, lead and bronze alloys prior to foreseen next treatments. These materials will be thereafter referred to as metals.

2. Prior Art

Magnetic induction crucible furnaces for heating and melting of metals by an alternate magnetic field are well-known.

The known induction furnaces permit use of solid raw material from the start-up phases, but they must be supplied by high-frequency electrical energy and special power sources are necessary for the compensation of a high reactance. The electrical effectiveness of such furnaces is consequently low.

The induction channel furnaces have a high power efficiency, but during the start-up phases they use only liquid metal to fill all the space, where a Joule heat shares out. Therefore a channel induction furnace cannot be stopped during the whole operation process. Furthermore, an induction channel furnace tends to deposit on the inner walls oxides and inter-metallic materials as an effect of the opposition to the current induced in the magnetic field of the inductor. Many cleaning methods of induction channels are not effective, are too expensive and, most important, lead to great losses because of the interruption of the main melting process.

These type of furnaces do not provide any purification of molten metal during or after melting. They do not allow discharge of the molten metal without tilting the furnace. This operation can break the refractory of the apparatus. Only the magneto-dynamic pump, described in the Patent of Prof. V. Polishchik (USSR No 176.184) permits pumping out the treated metal, but this pump had been designed like a induction channel furnace and can be polluted by the melting process of metallic alloys.

The conventional magnetic induction furnaces are not able to purify the molten metal during or after melting; therefore, purification is achieved through mechanical stirring and addition of chemical components containing thorium and chlorine, causing a further pollution of the environment.

OBJECT AND SUMMARY OF THE INVENTION

Object of the invention is to overcome the disadvantages inherent in use of the known induction furnaces, through a process which assures, by magnetic stirring, the melting, degasing and purification of the metal.

Another object is to realize a magnetic induction apparatus which can exploit this process.

These and other objectives can be obtained by the method for melting and purification of aluminium, copper, brass, lead and bronze alloys, using the following stages:

charging of solid metallic raw material (scraps and ingots) inside a crucible;

electromagnetic induction heating and melting of metallic raw material in the crucible by means of a three-phase magnetic system with a horizontal travelling or pulsed magnetic field and creation of a turbulent flux inside the melt;

whirling stirring of melt by electromagnetic induction and purification of the melt by degasing the free hydrogen, deoxidating, and coagulation of the inter-metallic material and other non-electroconductive inclusions in agglomerates of sizes which can be effectively filtered;

discharging of the melt from the crucible by a magneto-hydrodynamic pump effect for next treatments, or technical actions such as the continuous or periodical casting through spray ceramic, fibre glass or carbon filter for mechanical filtration of the above mentioned agglomerates from the molten metal.

To realize this process the apparatus is comprised of two magnetic induction sets, one for heating and melting of the raw material and pumping the molten metal to the second set, which is used for purification and degasing of molten metal and transfer of it to a next treatment (continuous or periodical casting).

Each of the above mentioned sets is essentially comprised of:

a pot or crucible;

an electromagnetic device;

a filter;

an electric power supply system.

Each crucible is surrounded in the lower part by a hollow permanent magnet in which couples of electromagnets are arranged, consisting of coils of electric wires which wind up cores consisting of rectangular blocks made of ferromagnetic material. These couples of electromagnets are arranged opposite each other adjacent to the crucibles; the electromagnets create the magnetic field required.

The shape of the ferromagnetic cores of the opposite arranged electromagnets is such that the magnetic field increases from the top to the bottom. The shape of the profile of the lower part of the crucibles repeats that of the above mentioned cores and has therefore a "V", "U" or intermediate shapes.

The crucible of the melting set is equipped with an outlet pipe made of electroconductive material for the discharge and transport of the molten metal inside the crucible of the second set. The inlet of this pipe is located near an extremity of the base of the crucible.

The second crucible is also equipped with an outlet pipe, made of electro-conductive material, in order to transfer the melt to the next system for subsequent treatment (casting). In this case as well, the inlet of this pipe has to be located close to the extremity of the bottom of the crucible.

Such pipes can be realized using non-electroconductive material. Their inlet can be located in any point of the crucibles, as above mentioned, because the proximity of the bottom of the crucibles the maximum effectiveness during transport of the melt is achieved as the metal flows into the pipes with the maximum possible speed.

The connections of the coils to the three-phase electrical net can be in the form of a star or triangle. The above mentioned couples of coils create primary travelling magnetic field inside the melting and the purification set. The magnetic field induces eddy currents inside the raw material of such intensity that this material is melted and/or kept at constant temperature.

Furthermore, this primary magnetic field induces material fluxes inside the crucibles. The differences between the various kinds of fluxes (number of vortexes and intensity) during melting or purification are obtained operating simultaneously on the following parameters: the level of the electric power and the different combinations of the connections of the coils to the three-phase system.

If the primary magnetic field is created exploiting the maximum electric power and connecting each couple of coils to a different phase of the AC (alternate current) net only a whirling flux is generated and this winds up all the space of the molten metal inside the crucible. Connecting all the couples of the coils to the same phase of the net and exploiting a lower power a certain number of whirling fluxes is generated inside the liquid metal. Stirring in this way the mass, the solid inclusions absorb on their surface the hydrogen dissolved inside the molten metal; the sizes of the agglomerates increase to the point to allow their extraction from the filters during the discharge of the liquid metal from the second crucible.

The magnetic field is also used for the discharge of the material from each crucible. The primary magnetic field is in all cases concentrated in the lower part between the magnets where the distance to the poles is small.

The travelling magnetic field is therefore used, according to this process, for the melting of the liquid metal and raw material, before and during the process of melting or remelting, and for intense stirring of it, as well as for pumping out the molten metal from the first and the second crucible.

For the realization of the above-mentioned technology, as an alternative, an apparatus with only one crucible can be used in which the whole process of melting and purification/degasing of the metal occurs, or more crucibles, or equal or different volumes.

The induction melting crucible can even have only two couples of electromagnets. In this case less effectiveness in terms of ratio between supplied and utilized electric power results. On the other hand, for the purification set a number of electromagnets equal to a multiple of three can be foreseen.

The surface of the electromagnetic cores of the opposite electromagnets can even be perfectly vertical; the shape of the profile of the lower part of the crucible, being similar to those of the poles, will be vertical in this case.

The effectiveness of the above mentioned sets is reduced. The crucibles can be equipped with airtight covers in order to keep the vacuum in the environment. These covers are connected to the appropriate vacuum plant in order to create vacuum in the crucibles.

Even the pipe for the transfer of molten metal from one crucible to the other can be equipped with a filter at one of the extremities.

The present process permits to utilize only one set both for melting and purification of metals. Such processes can be stopped and re-started at any moment.

Operating on the electrical connections it is possible to pilot the set for different functions: melting, purification, transport, discharge.

Treatments with chemicals are no longer necessary for purification.

The total power supplied to the system during melting is almost half of that needed by other known induction melting plants. This is due to the particular configuration of the system (presence of electromagnets only in the lower part of the crucible and the particular "V" configuration of the crucible) and to the fact that the already melted material is being stirred in order to wash off the still solid raw material, thus helping the melting process. The electrical power supplied during purification is 10% of the maximum nominal value. Usually during purification according to the known existing processes a high waste of power results as a consequence of the fact that the material must be melted again or kept at a high temperature.

The purified molten metal is discharged without tilting the crucible, drastically reducing the dangers while transferring the molten metal; furthermore, avoiding problems of breaking the refractory of the crucible are not present.

BRIEF DESCRIPTION OF THE DRAWINGS

Further characteristics and advantages of the invention result from the description of two, preferred and not exclusive, forms of execution of the apparatus, shown for approximate and not limiting purpose in the attached drawings, where:

FIGS. 9, 10 and 11 show the scheme of the coagulation of particles;

DETAILED DESCRIPTION OF THE PREFERRED EMBODIMENT(S) OF THE INVENTION

Figure 1:
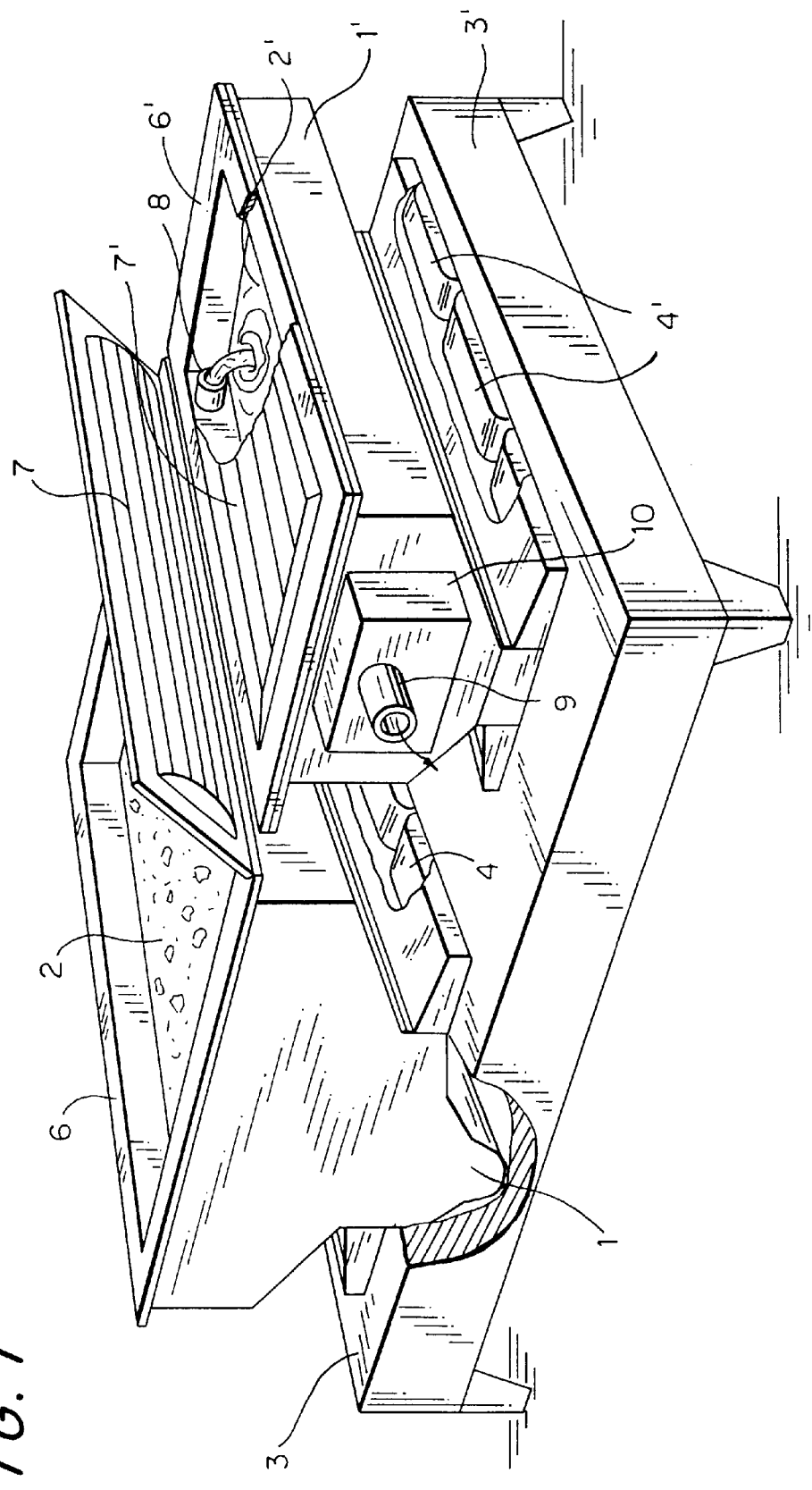
FIG. 1 shows a perspective view of the apparatus with two crucibles.
Figure 2:
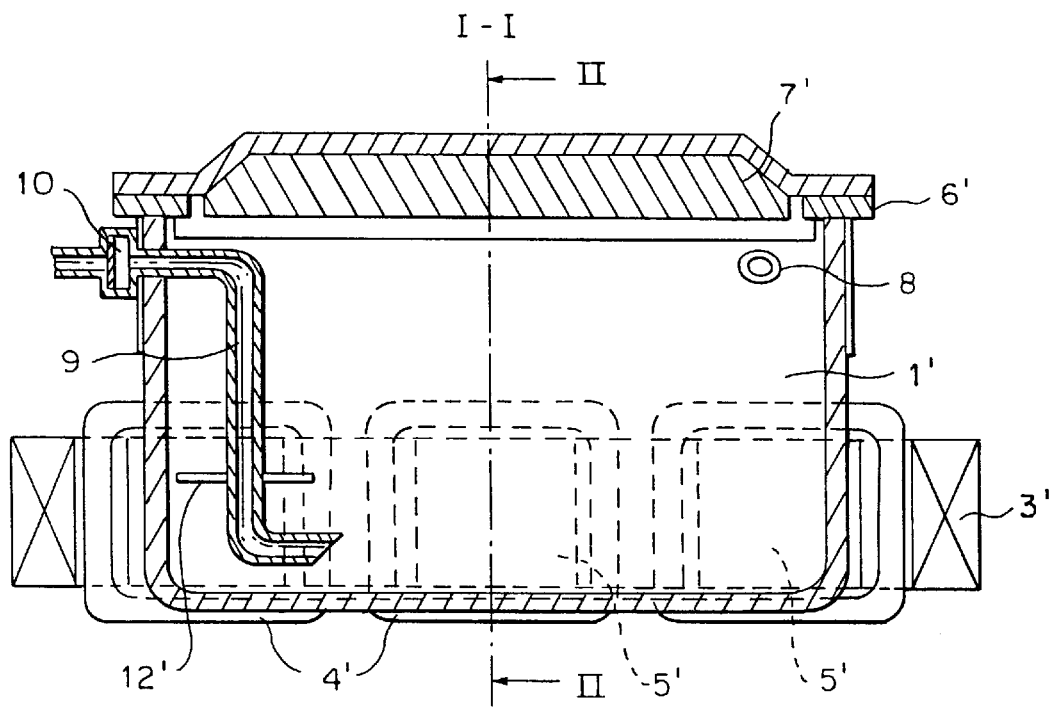
FIG. 2 shows the longitudinal section of the purification crucible and the relative electromagnetic device.
Figure 3:
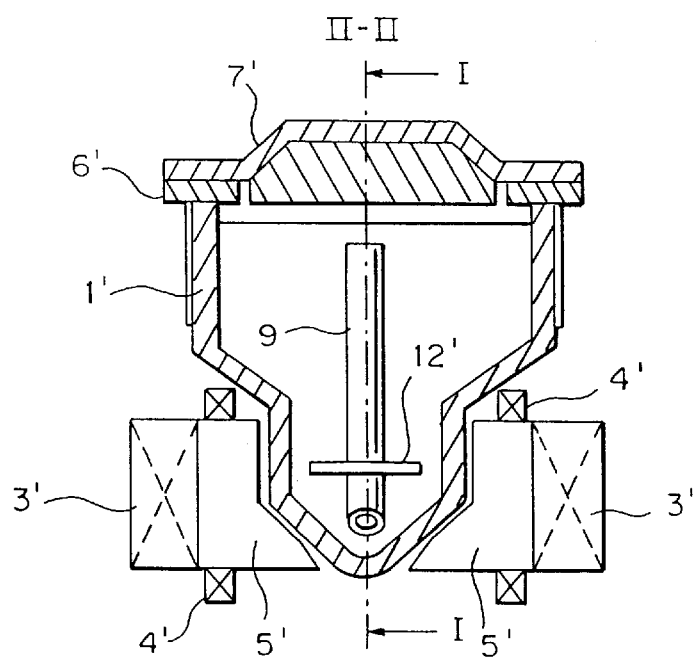
FIG. 3 shows the transversal section of the same crucible of FIG. 2.
Figure 4:
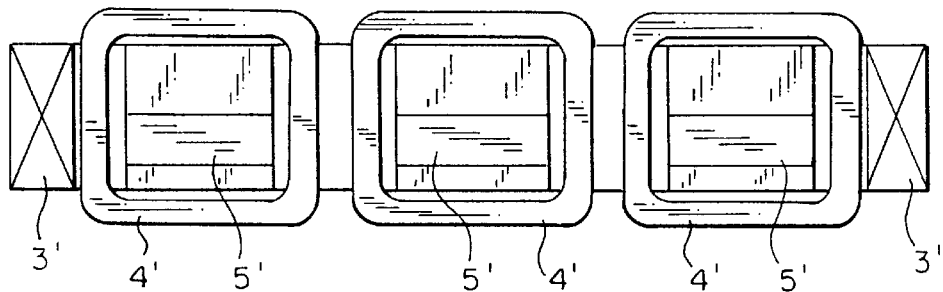
FIGS. 4 and 5 represent, respectively, the longitudinal and the transversal section of the above mentioned electromagnetic device.
Figure 5:
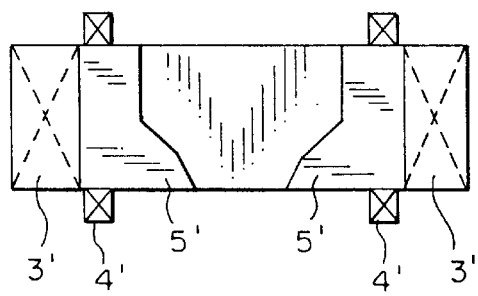
Figure 6:
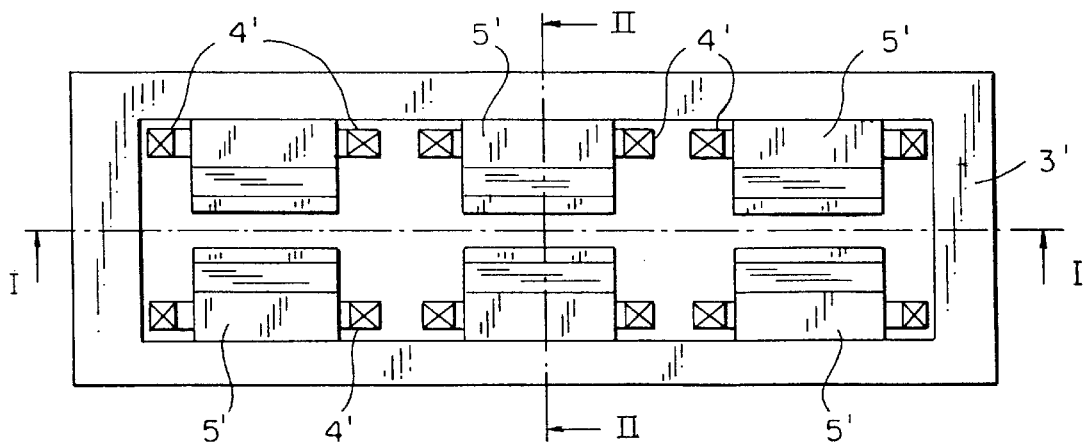
FIG. 6 shows an upper view of the same electromagnetic device.
Figure 7:
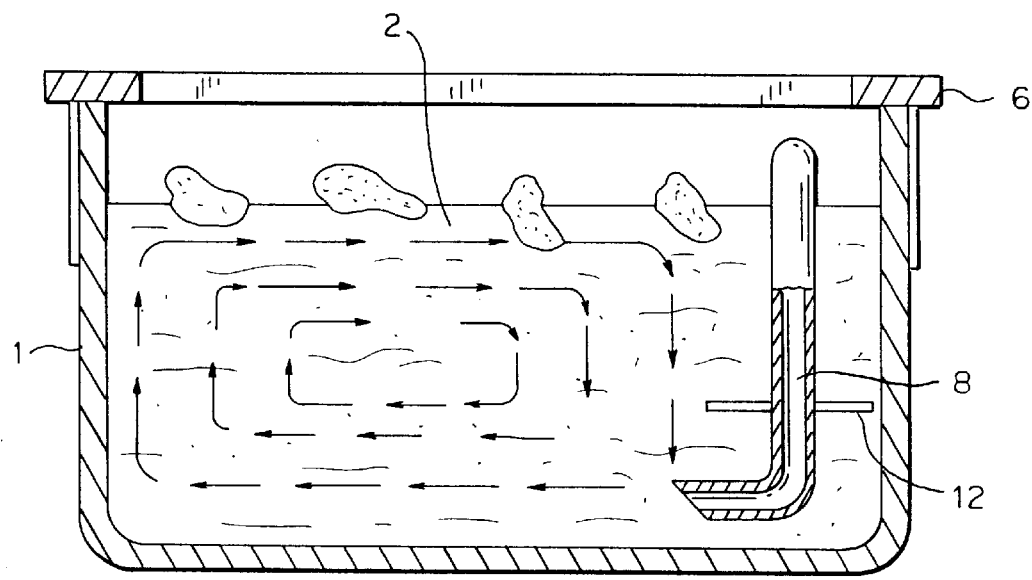
FIG. 7 shows the scheme of the raw material stirring through the travelling magnetic field during melting.
Figure 8:
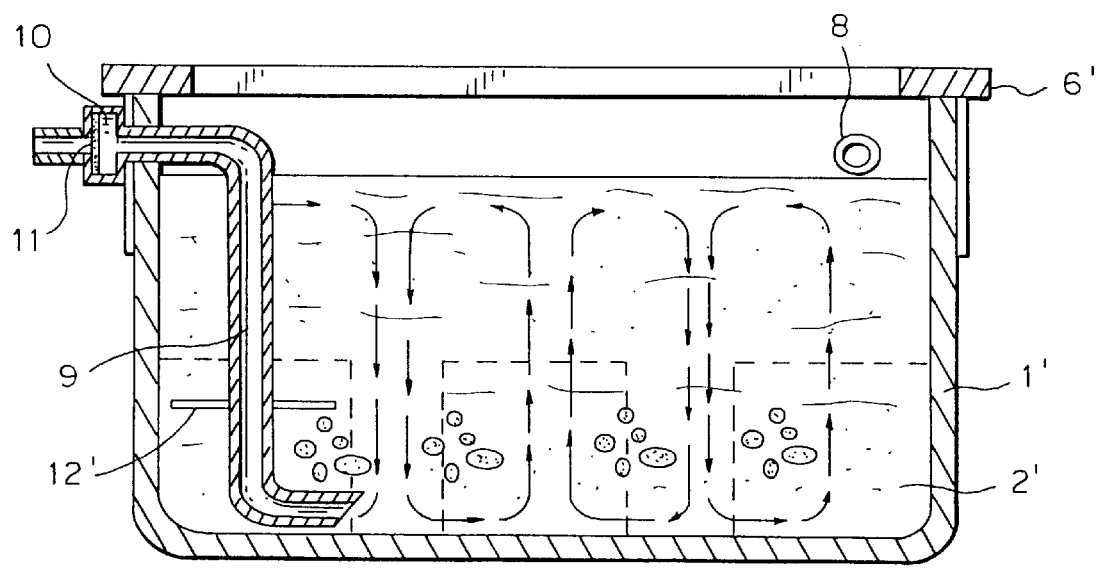
FIG. 8 shows the scheme of the vortexes generated inside the liquid metal during purification which permit the coagulation of the particles and the extraction of hydrogen.
Figure 12:
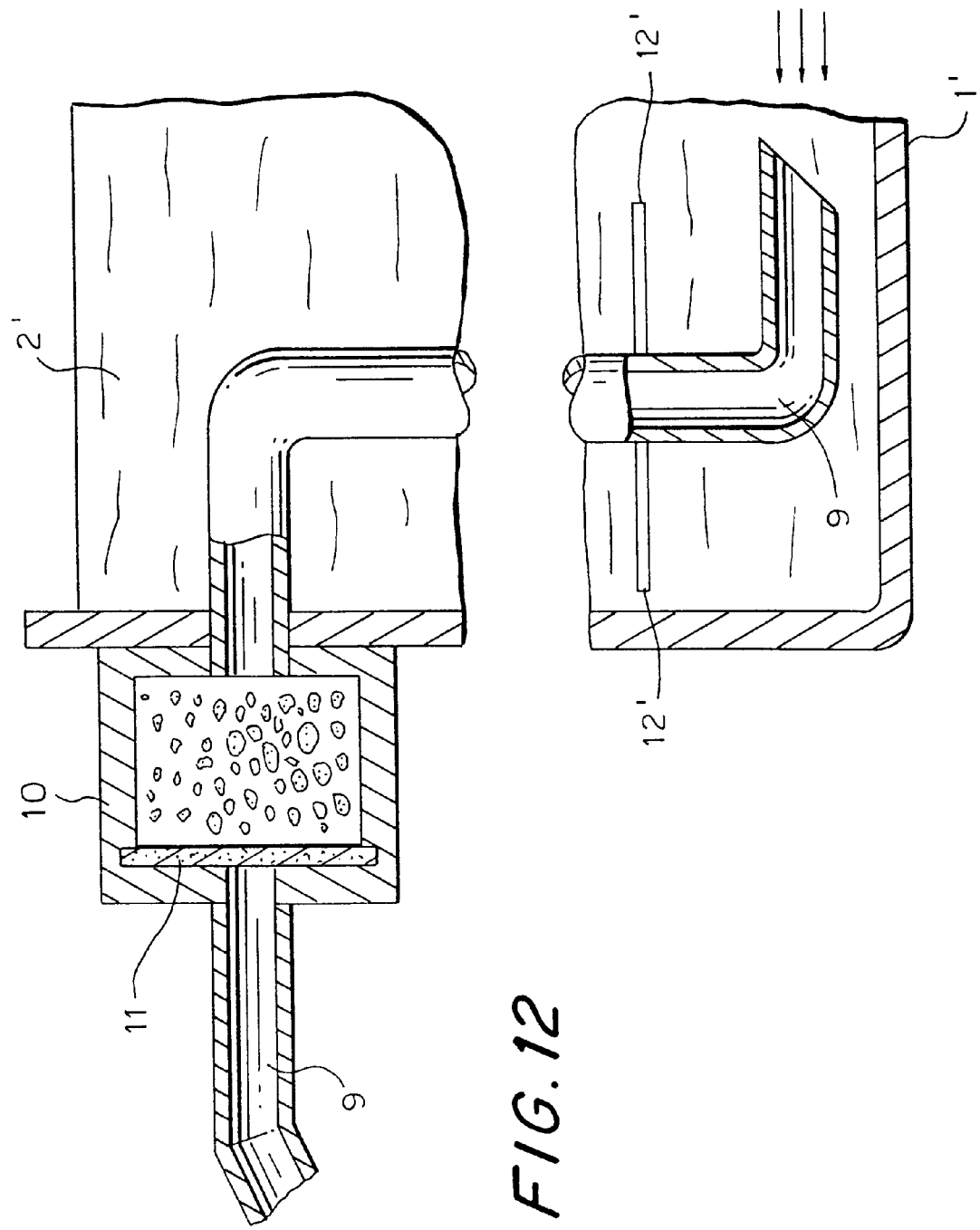
FIG. 12 shows a longitudinal section of the outlet pipe discharging the molten metal from the purification crucible where the device for filtration of grown particles is evident.
Figure 13:
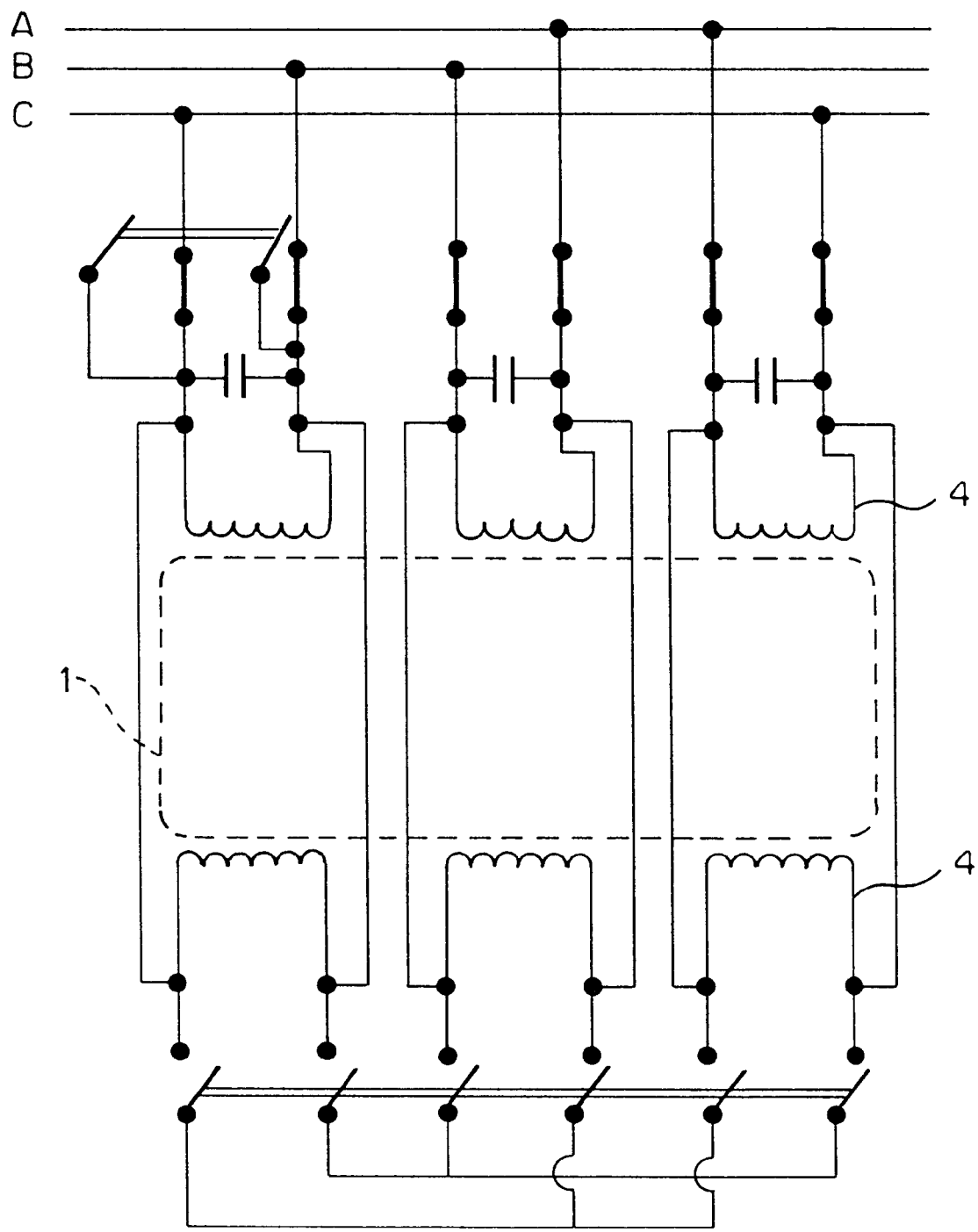
FIGS. 13, 14 and 15 represent the electrical schemes of the apparatuses during, respectively, melting, discharge and purification.
Figure 14:
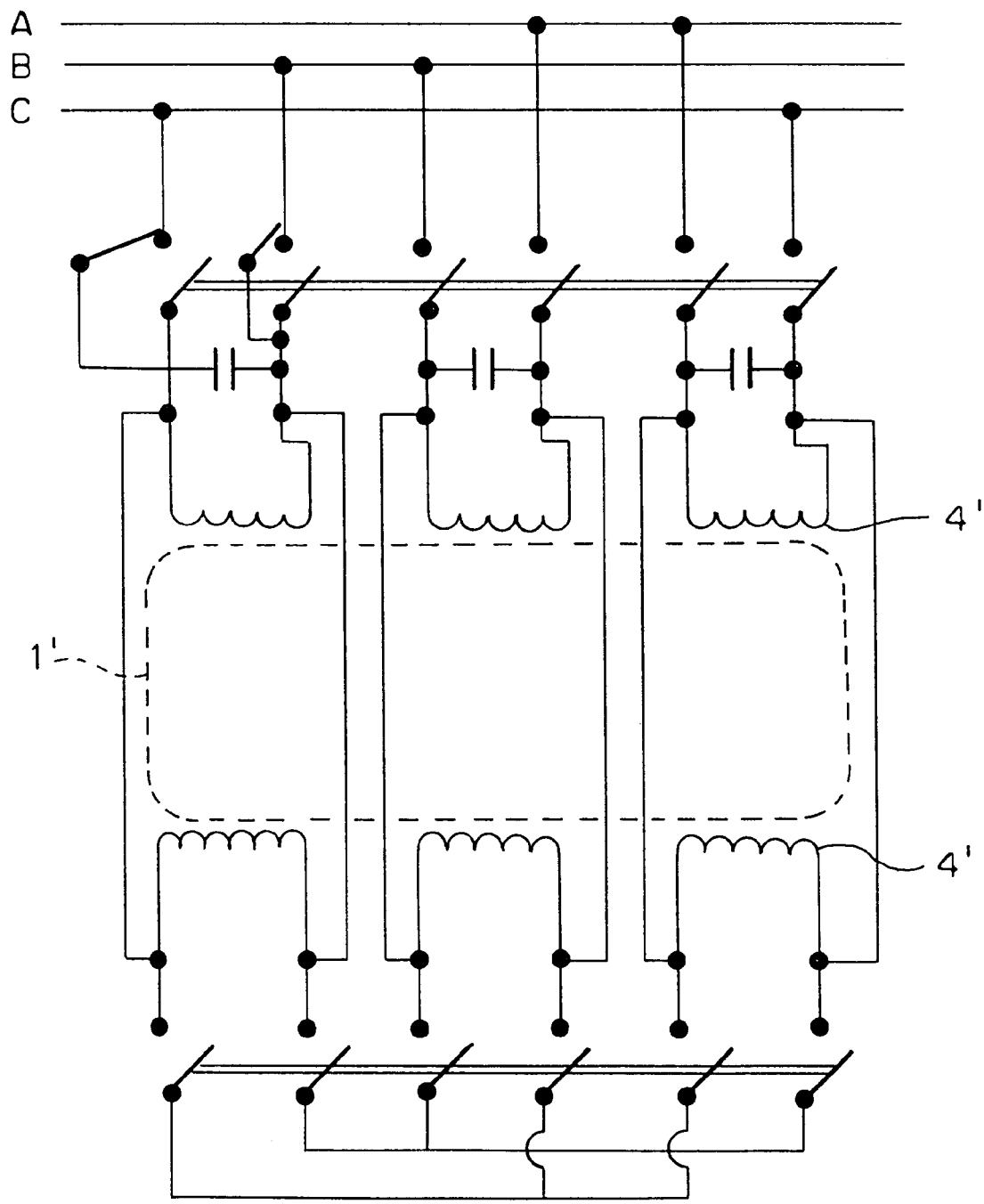
Figure 15:
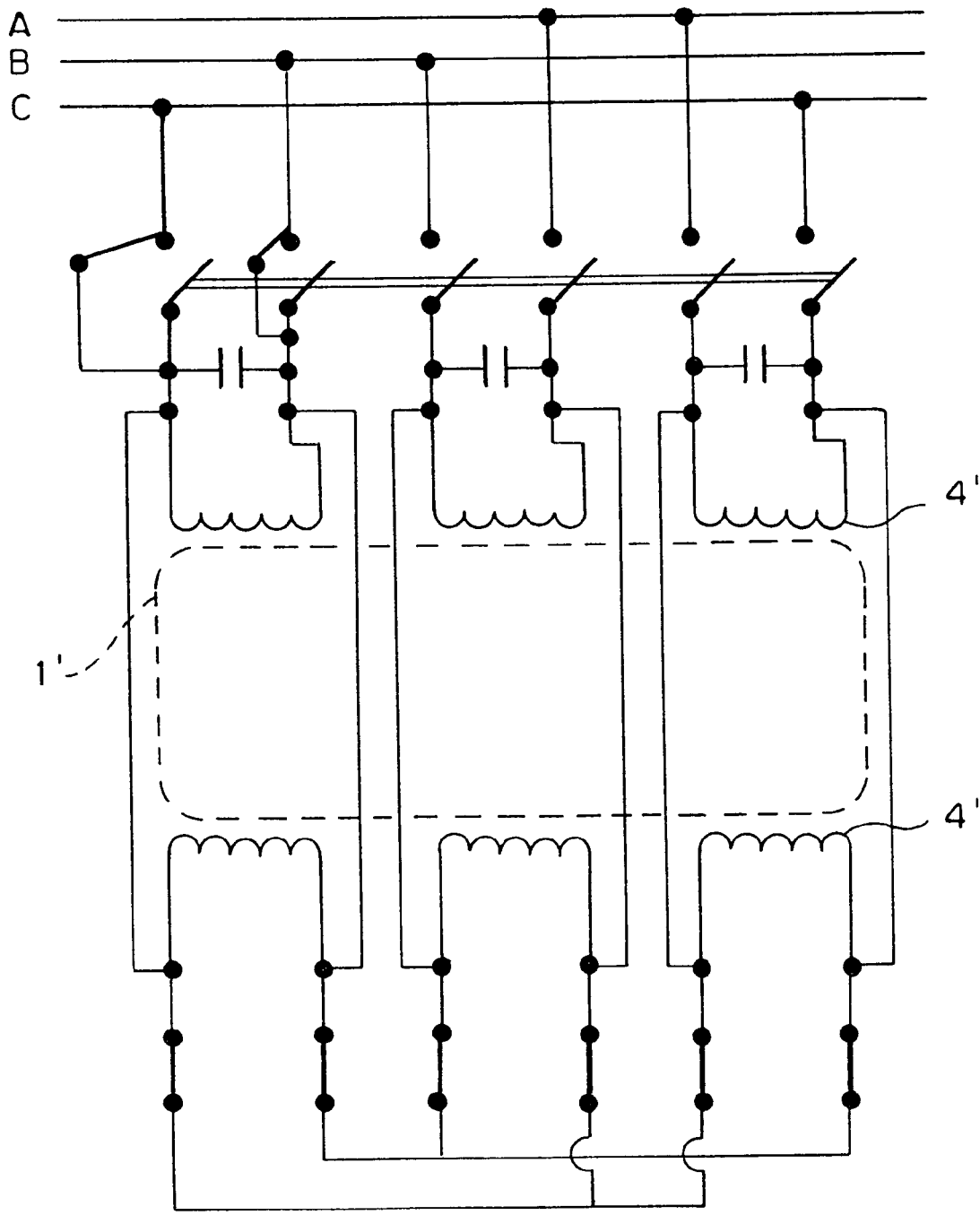

More in particular, the above-mentioned process is implemented through an apparatus equipped with two ceramic crucibles 1, 1', one only for melting of raw material 2 and the second for purification of molten metal 2'.

Each of these crucibles 1, 1' is surrounded at its base by a hollow permanent magnet 3, 3' (magnetic core) inside of which are three pairs of electromagnets realized by coils 4, 4' of electric wires (enclosed by an envelop of insulator) winding cores consisting of rectangular blocks 5, 5' of ferromagnetic material, e.g. iron. The three pairs of electromagnets are arranged opposite each other; inside the electromagnets are the poles of the magnetic field, induced by the electromagnets themselves. The rectangular blocks 5, 5' are cut in such a manner that the field increases from the top to the bottom.

The coils 4, 4' operating independently, are connected to a three phase AC (alternate current) electric net in different ways. The magnetic flux passes through the gap between the pairs of poles and closes through the rectangular circuits passing through the yoke of hollow permanent magnets 3, 3'.

The shape of the profile of the lower part of crucibles 1, 1' corresponds to that of the rectangular blocks 5, 5'.

The upper edges of the ceramic crucibles 1, 1' are surrounded by a border 6, 6' which is connected to the walls of crucibles 1, 1' by ceramic glue.

The melting crucible 1 and the purification crucible 1' are closed by covers 7, 7'; both covers 7, 7' are airtight to keep in vacuum the inner environment.

An outlet pipe 8 connects, passing through the lateral walls, crucibles 1, 1'; a second outlet pipe 9, still passing through a lateral wall, permits the discharge of the purified metal from crucible 1'. The outlet pipe 9 has at its external extremity a box 10 containing changeable ceramic or fibre filters 11 for filtering the coagulated particles.

The outlet pipes 8, 9 are made of a non-electroconductive material. The inlet of both pipes are located near one extremity of the bases of crucibles 1, 1'. In proximity of the inlet of the outlet pipes 8, 9 funnel conveyors (e.g. simple laminas) 12, 12' of the molten metal are present.

The outlet pipes 8, 9 are airtight engaged inside the walls of crucibles 1, 1'. The extremities of the outlet pipes 8, 9 and those of the their conveyors 12, 12' do not contact the base of crucibles 1, 1'; as a consequence a space is present between these parts and the lower part of each crucible 1, 1'.

The process of melting and purification of metal occurs as follows.

The melting crucible 1 is charged with raw material 2 (ingots or metallic scraps). An alternate current supplies the pairs of coils 4. At a first moment each pair of coils 4 is connected to a different phase (A, B and C) of the three-phase power supply. The electromagnets generate a travelling primary horizontal magnetic field, horizontally arranged between the couples of poles of ferromagnetic material.

This field induces eddy currents inside the raw material thus creating a Joule heating and electromechanical forces (or Lorenz forces) producing a magneto-hydrodynamic flux with transfer of mass inside crucible 1.

The Joule heat generated by these currents is intense enough to heat the raw material up to the melting temperature thus transforming the raw material to a liquid. As the electromagnets are arranged in the lower part of crucible 1 the density and the action force of the currents are much higher in this zone and therefore, with the increasing downwards of the field, the molten metal is at the beginning all in the lower part of crucible 1. The travelling magnetic field induces the movements of the molten metal; the melt washes off the solid raw material at the top and, as a heating element, improves the melting process. Thus lower electrical power is needed.

As described before, the magnetic field creates a magneto-hydrodynamic flux inside the molten metal. This occurs by the interaction between the primary magnetic field and the eddy currents inside the pieces of raw material and the molten metal, as a consequence of the presence of the electromagnetic forces. These forces generate a whirling flux winding all the space of the molten metal inside crucible 1 and permitting the movement of pieces of raw material or the flow of the melt inside crucible 1. The travelling magnetic field is therefore used both for melting and intensively stirring the liquid metal and the raw material during the melting process.

The electric power inside the coils during the phases of heating and melting of raw material is maximum (100%) in order to generate through the eddy currents the heat necessary for melting.

After the completion of melting of all the raw material inside crucible 1, for implementing the next stage of discharging and transferring the molten metal to the second crucible 1', only a pair 4 of coils of the melting crucible 1 is connected to a mono-phase of the three-phase voltage system (whereas the other two phases are not electrically connected) but in order to reverse the movement of the magnetic field, thus reversing the movement of the molten metal.

The molten metal, enclosed by the travelling magnetic field, is pushed towards the funnel conveyor 12 of the outlet pipe 8.

Conveyors 12, 12' of pipe 9 have two functions: to enhance the inlet surface of pipes 8, 9 and to increase the turbulence around their inlet and inside the space between the conveyors 12, 12' and the bottom of crucibles 1, 1'. Increasing the turbulence the viscosity decreases and the material can flow easier into pipes 8, 9.

The molten metal, pushed by the Lorenz forces, is therefore obliged to flow into pipe 8 up to its outlet and is then pumped into the purification crucible 1'. The travelling magnetic field is therefore used to transfer the molten metal outside crucible 1. After discharging, crucible 1 is ready to be feed the next charge of raw material.

When the molten metal is inside crucible 1' all the pairs of coils 4' surrounding it are connected to the same voltage phase (mono-phase supply). The lateral couples of coils 4' are connected with the same polarity (in parallel) whereas the central couple of coils 4' can be connected in phase opposition with respect to the lateral couples.

The electromagnets generate a primary horizontal travelling magnetic field, horizontally arranged between the three couples of poles of ferromagnetic material. Even in this case the magnetic field induces eddy currents inside the raw material, thus causing a Joule heating. The Joule heat, generated by these currents, is of such intensity as to compensate only the heat losses to the environment and to keep the metal in the liquid state. The current inside the coils 4' can therefore be reduced to 10% with respect to the melting phase. The value of voltage must be high enough to create the above mentioned whirling fluxes inside the molten metal.

The magnetic field produces, in the same way as mentioned before, magneto-hydrodynamic fluxes (with transfer of mass) inside the molten metal through the interaction of the primary magnetic field and the eddy currents inside the molten metal, as a result of the electromagnetic forces (or Lorenz forces).

But, as a result of the particular connection in this case three circuits of current inside the molten metal are generated: around the magnetic flux generated by each couple of poles. They cause the creation of four (for values of current lower than 10 A) or six (for values greater than 20 A) vortexes inside the molten metal as a consequence of the process of separation and coagulation of inclusions inside the molten metal described later on.

As the electromagnets are arranged in the lower part of crucible 1', the density of the magnetic flux, of the eddy currents and of the electromagnetic forces increases from the top to the bottom of crucible 1'.

The process of coagulation and separation of inclusions is very strong, stronger than the simple magneto-hydrodynamic separation. Particles 13 of different non-electroconductive solid inclusions (particles of oxides, inter-metallic materials, etc.) move into the molten metal through the action of the above described electromagnetic forces; these forces depend on the volume and on the cross section of particles 13. As a result the particles 13 move at different speeds (indicated as $V_x$ in FIGS. 9, 10 and 11), even if submitted to the same electromagnetic forces, and, therefore collisions between them are possible.

The solid particles 13 absorb on their surface the gases dissolved inside the molten metal, in particular hydrogen ($H_2$), as small bubbles. While the particles 13 flow in whirls they collide with each other; the contact of the different particles 13 with hydrogen bubbles, present on the surface, induces very strong capillary forces which cause the joining of particles 13 in agglomerates. This joining of particles 13 is a irreversible process and the increase of the sizes of particles 13 occurs spontaneously.

The intensity and quantity of the collision of particles 13 increases because of the different velocity of particles 13. The coagulation process continues with great intensity. The increase of the mass of the joining particles 13 is proportional to the fifth power of the size of particles 13. The sizes of the agglomerates, thus formed, depend on the time of treatment: after some minutes the size of the agglomerates increases up to 2–4 mm. The quantity of the smaller particles 13 decreases as a consequence of the absorption by the greater particles. After some minutes of coagulation treatment vacuum can be created inside the two crucibles 1, 1' apart from the eventual prosecution of melting inside crucible 1. The vacuum treatment is not compulsory, but required for particular specifications of the molten metal.

The discharge of purified metal 2' from the second crucible 1' for continuous casting to the next process step is realized connecting only one couple of coils 4' of crucible 1' to a mono-phase of the three-phase voltage system. The total pressure (stimulation of the movement and magnetic components of pressure) during discharge increases up to the necessary level for the emptying of the molten metal 2'. The molten metal, pushed by the Lorenz forces, is therefore obliged to flow into pipe 9 up to its outlet and is then pumped outside. The travelling magnetic field is therefore used to move the molten metal away from crucible 1'.

During the discharge of the molten metal from crucible 1', the coagulated particles of oxides, of inter-metallic material and of gases absorbed on the surface of particles 13 are extracted through the changeable ceramic or fibre filters 11 inside the box 10. The so conceived apparatus, can be modified in different ways, all included in the initial inventive concept. Furthermore, all the parts can be substituted with others technically equivalent.

Figure 16:
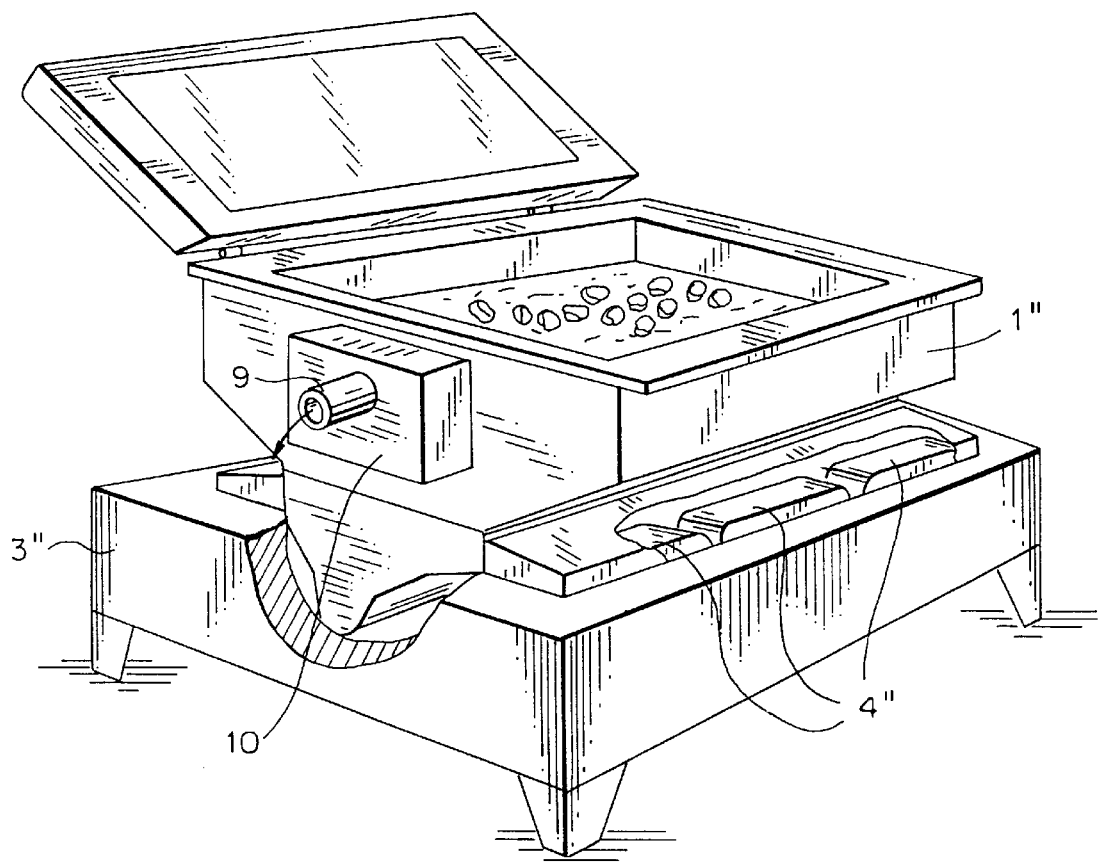
FIG. 16 shows the perspective view of an apparatus with one crucible.

We point out that among these variants the apparatus shown in FIG. 16 is equipped with only one crucible 1" in which both melting and purification of metal occur. This apparatus is similar to those previously described: presence of a hollow permanent magnet 3", of pairs of electromagnets realized by coils 4", etc.

We claim:

1. Apparatus for melting and purification of aluminium, copper, brass, lead and bronze alloys, said apparatus comprising:

two induction sets, a first set of said two induction sets used for heating and melting of raw material and pumping molten metal derived therefrom into a second set of said two induction sets, the second used to purify and degas the molten metal and thereafter discharge the molten metal for further treatment, each of said two induction sets having a crucible, electromagnetic means for heating the raw material in the crucible, and a permanent magnetic surrounding both a lower part of the crucible and the electromagnetic means, the crucible of said first set communicating molten metal to the crucible of said second set by a first pipe and the crucible of said second set discharging the molten metal through a second pipe, said second pipe having a filter for filtering coagulated inclusions, said electromagnetic means comprising at least two pairs of electromagnets, each pair of said two pairs of electromagnets respectively arranged opposite each other on sides of the crucible, and independently connected to a three-phase alternate current in a manner permitting variation of a phase of the alternate current delivered to each of the two pairs of electromagnets a form of a core of each of the two pairs of electromagnets corresponding to a form of the lower part of the crucible so that a magnetic field produced by the two pairs of electromagnets increases from a top of said core to a bottom of said core, each crucible being closed by a cover and a funnel conveyor being engaged next to an inlet of said first pipe and an inlet of said second pipe.

2. The apparatus according to claim 1, wherein a cross section of the crucible has a V-shape.

3. The apparatus according to claim 1, wherein a cross section of the crucible has a U-shape.

4. The apparatus according to claim 1, wherein the inlet of said first pipe are located near a base of the crucible.

5. The apparatus according to claim 1, wherein said electromagnetic means comprising three pairs of electromagnets.

6. The apparatus according to claim 1, wherein said electromagnetic means comprises electromagnets equal to a multiple of three.

7. The apparatus according to claim 1, wherein both a part of the core next to the crucible and the lower part of the crucible are vertical.

8. The apparatus according to claim 1, wherein the cover engaged to the crucible is airtight and creates a vacuum inside the crucible.

9. The apparatus according to claim 1, wherein the first pipe and the second pipe are made of a non-electrocondutive material and the inlet for the first pipe and the second pipe can be located at any point in the crucible.

10. A process for melting and purification of aluminium, copper, brass, lead and bronze alloys using the apparatus according to claim 1, comprising the steps of:

introducing the raw material into the crucible of the first set;

electromagnetic induction heating and melting of the raw material in the crucible of the first set by means of a three-phase magnetic system with a horizontal travelling and pulsed magnetic field and creation of a turbulent flux inside the molten metal;

stirring of the molten metal in the crucible of the second set by electromagnetic induction, purification of the molten metal by degasing the free hydrogen, deoxidating, and coagulation of inter-metallic material and non-electroconductive inclusions in agglomerates of sizes which can be effectively filtered; and filtering and discharging of the molten metal from the crucible of the second set by a magneto-hydrodynamic pump effect for further treatment.

11. The process according to claim 10, wherein density of the eddy currents and electromagnetic forces are greater in the lower part of the crucible due to positioning the electromagnets adjacent to the lower part of the crucible and increasing the magnetic field from the top to the bottom of the core.

12. Apparatus for melting and purification of aluminium, copper, brass, lead and bronze alloys, said apparatus comprising;

a single induction set for heating and melting raw material and purifying, degasing and discharging molten metal derived from heated and melted raw material for further treatment;

said induction set having a crucible, electromagnetic means for heating the raw material and molten metal and a permanent magnetic surrounding, a lower part of the crucible and the electromagnetic means, said crucible having a pipe for discharging the molten metal from the crucible, said pipe having a filter for filtering coagulated inclusions from the molten metal;

said electromagnetic means comprising at least two pairs of electromagnets, each pair of said two pairs of electromagnets respectively arranged opposite each other on sides of the crucible and independently connected to a three-phase alternate current to permit variation of a phase of the alternate current delivered to each of the two pairs of electromagnets;

a shape of a core of each of the two pairs of electromagnets, corresponding to a shape of a lower part of the crucible so that a magnetic field produced by the two pairs of electromagnets increases from a top of said core to a bottom of said core;

the crucible being closed by a cover and a funnel conveyor being engaged to an inlet of said pipe.

13. The apparatus according to claim 12, wherein said electromagnetic means comprises three pairs of electromagnets.

14. The apparatus according to claim 12, wherein density of eddy currents and electromagnetic forces are greater in the lower part of the crucible because the electromagnets are adjacent to the lower part of the crucible and the magnetic field increases from the top to the bottom of the core.

15. The apparatus according to claim 12, wherein a cross section of the crucible has a V-shape.

16. The apparatus according to claim 12, wherein a cross section of the crucible has a U-shape.

17. The apparatus according to claim 12, wherein both a part of the core next to the crucible and the lower part of the crucible are vertical.

18. The apparatus according to claim 12, wherein the cover engaged to the crucible is airtight and creates a vacuum inside the crucible.

* * * * *